June 21, 1949.                H. M. PFLAGER                2,474,012
                               RAILWAY TRUCK
Filed Aug. 30, 1944                                        3 Sheets-Sheet 1
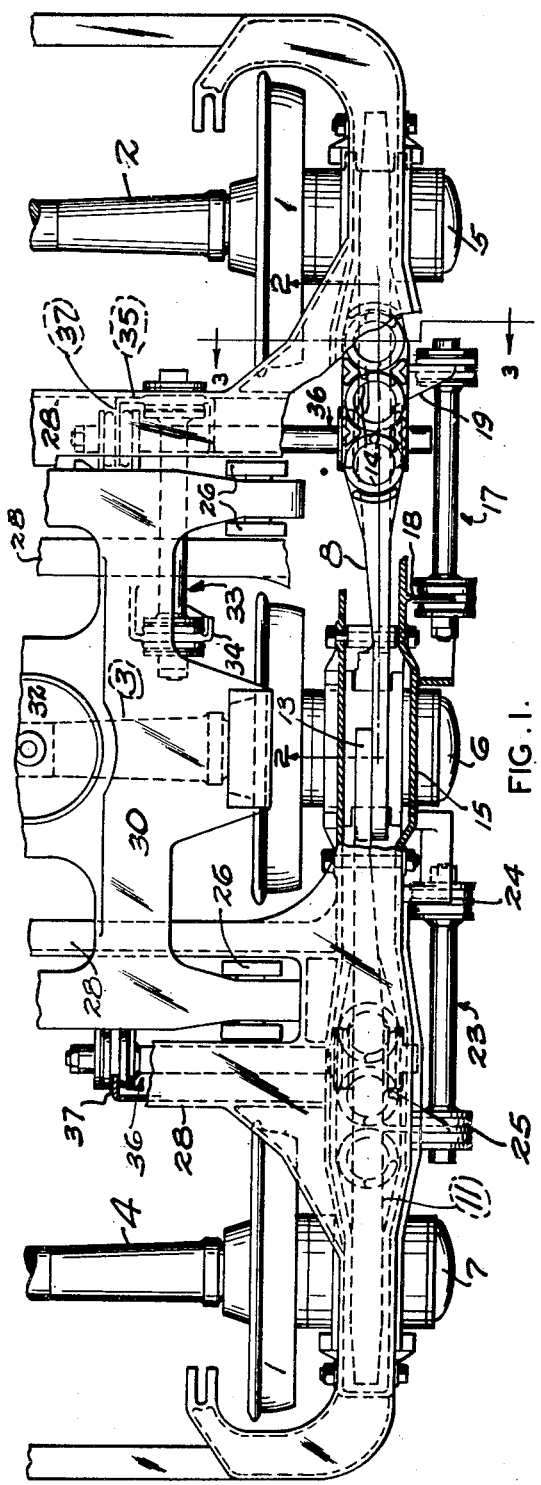
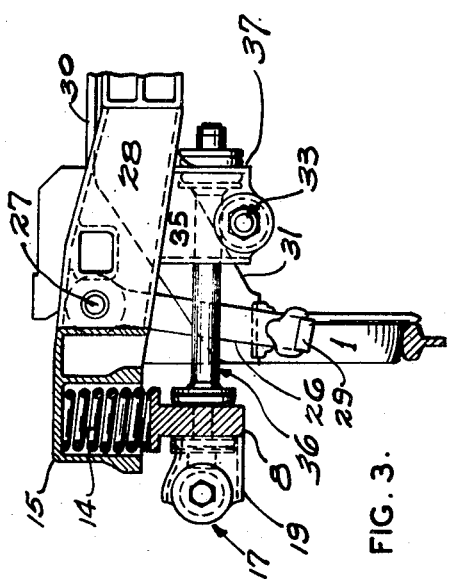
INVENTOR.
HARRY M. PFLAGER
BY *Rodney Bedell*
ATTORNEY June 21, 1949.    H. M. PFLAGER    2,474,012
RAILWAY TRUCK
Filed Aug. 30, 1944    3 Sheets-Sheet 2

INVENTOR.
HARRY M. PFLAGER
BY *Rodney Bedell*
ATTORNEY.

June 21, 1949.    H. M. PFLAGER    2,474,012
RAILWAY TRUCK

Filed Aug. 30, 1944    3 Sheets-Sheet 3

INVENTOR.
HARRY M. PFLAGER

BY  Rodney Bedell

ATTORNEY.

Patented June 21, 1949

2,474,012

UNITED STATES PATENT OFFICE 2,474,012

RAILWAY TRUCK

Harry M. Pflager, St. Louis, Mo., assignor to General Steel Castings Corporation, Granite City, Ill., a corporation of Delaware Application August 30, 1944, Serial No. 551,829

8 Claims. (Cl. 105—195)

1

The invention relates to railway rolling stock, and more particularly to railway trucks and is especially adapted for use in six-wheel trucks in which the truck load is distributed to the wheeled axles by equalizers extending between the axle boxes.

The main object of the invention is to facilitate the movement of the wheel, axle and journal box assemblies and the equalizers relative to each other and relative to the truck frame.

This object is attained by avoiding close fitting sliding bearings between the truck frame and the axle boxes and equalizers and by positioning the axle boxes and equalizers longitudinally and transversely of the truck by means of anchoring devices provided with substantially pivotal connections to the equalizers between the ends of the latter. The construction accommodates the relative shifting of the wheel, axle and journal box assemblies transversely of the truck, under rail and wheel thrusts such as arise particularly on curved tracks, and also accommodates relative vertical movement of the frame and wheel and axle assemblies and equalizers as arise from rail joints and other track inequalities.

This and other detail objects of the invention as will appear from the following description are attained by the structure illustrated in the accompanying drawings, in which—

Figure 1 is a top view of one longitudinal half of a six-wheel truck, portions being broken away and parts sectioned on the line 1—1 of Figure 2 to more clearly illustrate essential features of the construction.

Figures 3, 4 and 5 are detail vertical transverse sections taken on the corresponding section lines of Figure 2.

Figure 2:
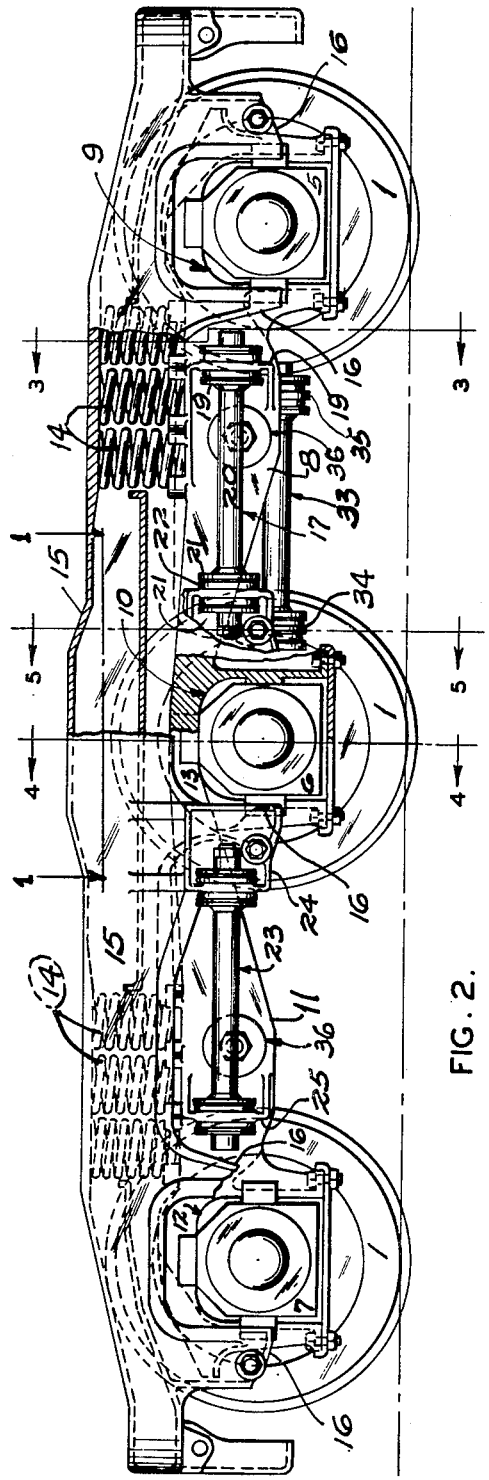
Figure 2 is a side elevation of the structure shown in Figure 1, a portion of the structure being sectioned approximately on the line 2—2 of Figure 1.
Figure 4:
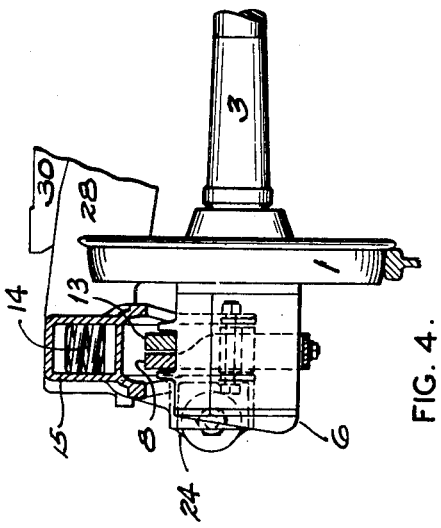
Figure 5:
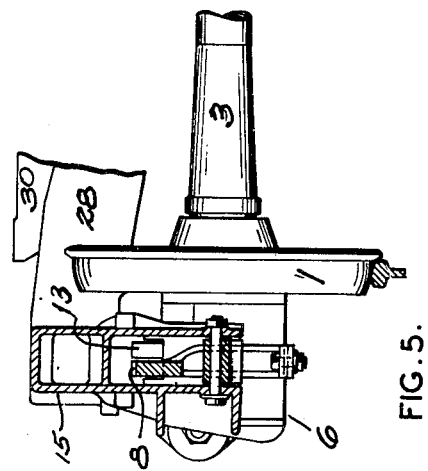
Figure 6:
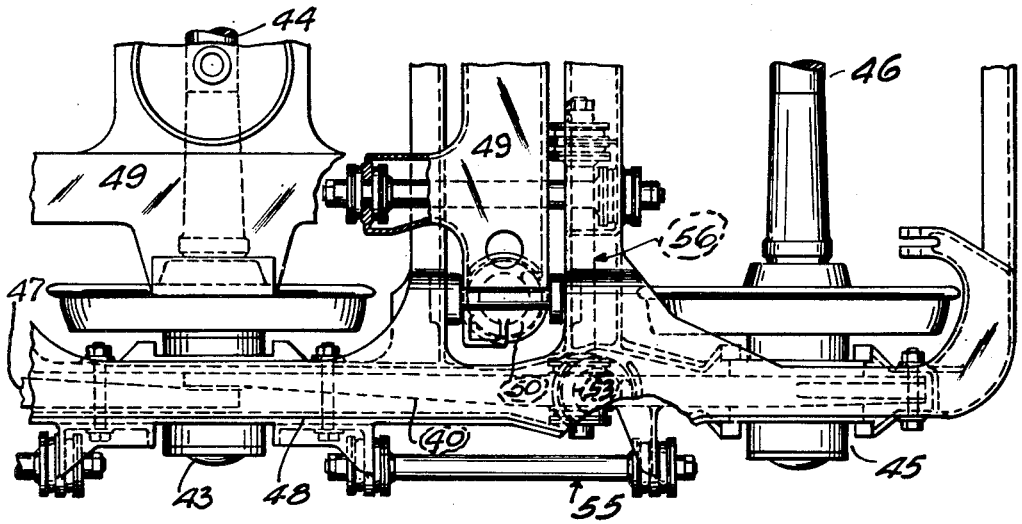

Figure 6 corresponds generally to Figure 1 and shows part of a six-wheel truck embodying another form of the invention.

Figure 7:
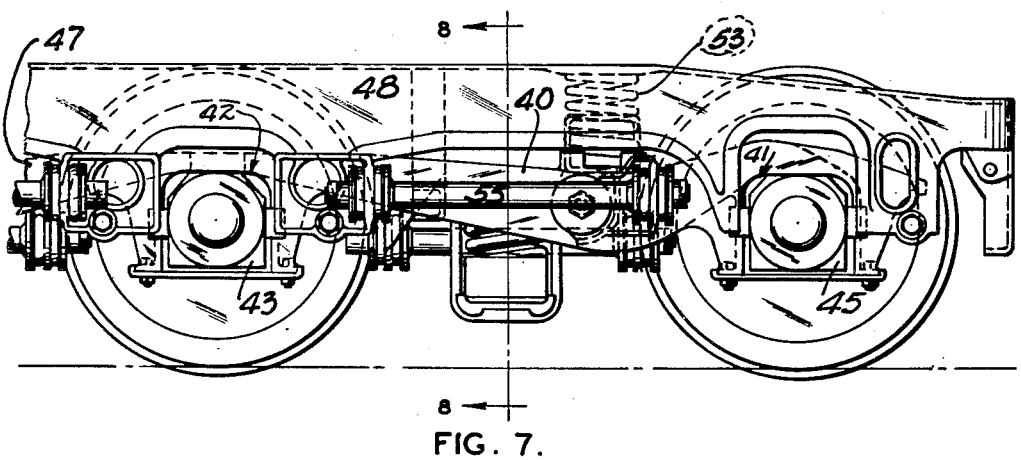

Figure 7 is a side view of the structure shown in Figure 6.

Figure 8:
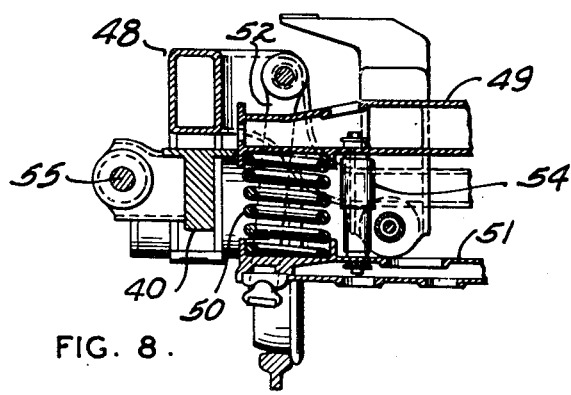

Figure 8 is a detail vertical transverse section taken on the line 8—8 of Figure 7.

The truck shown in Figures 1–5 includes the usual wheels 1 and axles 2, 3 and 4 having journal boxes 5, 6 and 7 respectively at one side of the truck. An equalizer 8 is supported upon journal boxes 5 and 6 on one end axle and on the middle axle respectively and is provided with downwardly opening yokes 9 and 10 at its opposite ends for

2 slidably receiving the corresponding boxes 5 and 6 and holding the same and the corresponding journals in spaced relation. An equalizer 11 has a downwardly opening yoke 12 at its outer end, corresponding to yokes 9 and 10, slidably receiving journal box 7 on the other end axle. The other end 13 of equalizer 11 rests on top of journal box 6 and does not have a yoke portion fitting the box, nor does it otherwise engage the box to hold boxes 6 and 7 in spaced relation.

Groups of coil springs 14 are mounted upon equalizers 8 and 11 and support the truck frame wheel piece 15 in the usual manner. If desired, these springs may be provided with one or more snubbers. Brackets 16 depend from wheel piece 15 at opposite sides of journal boxes 5, 6 and 7 and form safety lugs to keep the axles and truck in assembled position in the event of breakage of the equalizers, but normally these brackets do not engage the interposed journal boxes.

An anchor device 17 has its opposite ends connected respectively to a bracket 18 on the truck frame and to a bracket 19 on equalizer 8 adjacent to associated springs 14 and holds the frame and the equalizer, and the journal boxes engaged thereby, against substantial relative movement longitudinally of the truck. This anchor device includes a spacer 20 with collars 21 and rubber pads 22 made in accordance with the disclosure of V. L. Green Reissue Patent No. 21,987, issued December 30, 1941, and readily accommodates relative vertical movement of the equalizer and truck frame, due to the action of springs 14 while resisting relative longitudinal movement of these parts, but at the same time avoiding metal to metal contact between these parts.

A similar anchor device 23 has its ends connected respectively to a bracket 24 on the truck frame and to a bracket 25 on equalizer 11 adjacent to associated springs 14 and holds the frame and this equalizer, and the journal box engaged thereby, against substantial relative movement longitudinally of the truck.

Hence, the left hand journal box 7 is held in spaced relation to the other journal boxes, through equalizer 11, anchor device 23, frame wheel piece 15, anchor device 17 and equalizer 8, but equalizer 11 may tilt or rock about the center journal box 6 because of the sliding support of the right hand end of equalizer 11 on journal box 6.

Spaced pairs of swing hangers 26 (Figure 3) are pivotally suspended at 27 from transverse transoms 28 extending between wheel pieces 15 at opposite sides of the truck. Each pair of swing hangers includes or supports a cross bar 29. A center bolster 30 has depending arms 31 supported on cross bars 29 and hence is suspended by hangers 26 from the truck frame so as to move transversely of the frame in a well known manner. The truck load is applied to bolster 30 through the usual center plate 32.

The bolster and truck frame are held against substantial relative movement longitudinally of the truck by an anchor device 33 corresponding generally to devices 17 and 23 and connected at its opposite ends to a bracket 34 on the bolster and a bracket 35 on the truck frame.

It will be understood that anchors 17, 23 and 33 are duplicated at the opposite side of the truck and that these anchors position the bolster, truck frame, equalizers, journal boxes and axles relative to each other longitudinally of the truck. Transversely disposed anchor devices 36, corresponding to those previously referred to, are connected at their outer ends directly to equalizers 8 and 11 near associated springs 14 and at their inner ends to brackets 37 depending from transoms 28. Bracket 37 on transom 28 at the right hand end of the truck merges with bracket 35 to which the anchor 33 is connected.

In the usual truck construction involving a pedestal type frame, the journal boxes are slidable vertically in the pedestals and the thrusts between the frame and the journal boxes laterally and longitudinally of the truck are transmitted directly between interengaging elements on these parts which slide on each other and result in undesirable wear of these parts.

In the present arrangement, involving a pedestalless type of truck frame, thrusts are transmitted between the frame and the equalizers by the anchor devices connected to the frame and equalizers at points spaced from the axles. This arrangement not only avoids sliding action and wear of interengaged frame and journal box parts, but better accommodates relative shifting of the axles when the truck is on curved track.

The assembly may be considered as embodying a four-wheel unit and a two-wheel unit and the axles of the two units may incline vertically and shift transversely of the truck relative to each other because the equalizers are not held in alignment longitudinally of the truck, but each equalizer is connected to the truck frame and, through the latter, to the other equalizers at points on the equalizers spaced from the axles; hence the ends of the equalizers may move laterally of the truck frame. Abnormal movement of the ends of the equalizers is prevented by the opposing elements of the journal box and the frame safety lugs 16.

Preferably, the springs or the units of springs supporting the truck frame from the equalizers are mounted on the equalizers at or adjacent to the same portions of the latter to which the anchoring devices are connected. Hence, the relative transverse movement of the end portions of the equalizers necessary to accommodate the transverse shifting of the axles relative to each other and to the truck frame may occur without substantially shifting the spring-supporting portion of the equalizer relative to the frame, and this relieves the springs of substantial side thrusts.

The arrangement permits free relative vertical movement of all three axles as the left hand equalizer can tilt or rock on the center journal box while the center journal box and the end journal box of the right hand equalizer both move with the right hand equalizer as a unit.

Figures 6, 7 and 8 illustrate another form of the invention corresponding generally to that shown in Figures 1-5, particularly with respect to the arrangement of a pair of equalizers 40 with yokes 41, 42 for the journal boxes 43 of the middle axle 44 and for the journal boxes 45 of one of the end axles 46, forming a four-wheel unit, and equalizers 47 with yokes for the journal boxes of the other end axle (not shown) but slidably or pivotally mounted on the journal boxes of the middle axle, forming a two-wheel unit. However, this arrangement provides increased flexibility between the truck frame 48 and the center bolster 49 due to the yielding support of the latter by springs 50 carried by spring planks 51 suspended from the frame by swing hangers 52 instead of the direct support on the bolster from the swing hangers, as in the form previously described. This bolster spring works in series with the springs 53 supporting the truck frame, and a shock absorber 54 is connected to the spring plank and to the bolster to snub the action of the bolster springs and to prevent synchronization of vibrations of all the springs. In this arrangement, a single frame-supporting spring 53 is mounted on each equalizer, and the anchoring devices 55 and 56 which position the equalizer relative to the frame are connected to the same portion of each equalizer which mounts the associated spring 53.

In all essential respects, the structure illustrated in Figures 6-8 functions the same as that previously described and it will be understood that other features may be varied in detail without departing from the spirit of the invention, and the exclusive use of those modifications coming within the scope of the claims is contemplated.

What is claimed is:

1. In a railway six-wheel truck including wheels, axles and journal boxes, an equalizer extending between and supported by adjacent boxes, a spring unit supported by a portion of the equalizer spaced from the associated journal boxes, a pedestalless truck frame supported by said spring unit, and a plurality of elongated anchors with their ends connected to the frame and said equalizer portion respectively, one anchor elongated transversely of the truck and positioning the equalizer transversely of the truck relative to the frame and another anchor elongated longitudinally of the truck and positioning the equalizer longitudinally of the truck relative to the frame.

2. In a railway six-wheel truck including wheels, axles and journal boxes, equalizers extending between and supported by adjacent boxes, springs supported by portions of the equalizers spaced longitudinally of the truck from the journal boxes, a truck frame supported by said springs, each equalizer spring-supporting portion having associated therewith anchors extending from said portion longitudinally of the truck and transversely of the truck respectively, parts of said anchors remote from said equalizer portions being connected to the truck frame, the anchors holding the equalizers and truck frame against relative movement transversely and longitudinally of the truck into contact with each other.

3. In a railway six-wheel truck including three wheel, axle and journal box assemblies, equalizers supported from their ends upon two of said assemblies, equalizers supported from their ends upon the third assembly and one of the other two assemblies, springs carried by said equalizers, a truck frame supported by said springs, elongated anchors extending between and being connected at their ends to the frame and to an individual one of the equalizers and positioning the frame relative to the equalizers and the equalizers relative to each other longitudinally of the truck independently of the journal boxes and springs, the first-mentioned equalizers positioning the associated assemblies relative to each other and to the truck frame longitudinally of the truck, and the second-mentioned equalizers positioning the third assembly relative to the frame and, through the latter, relative to the other assemblies longitudinally of the truck.

4. In a railway six-wheel truck including three axles with wheels and journal boxes, an equalizer between one end axle and the middle axle and provided with yokes at its ends slidably receiving the corresponding journal boxes, another equalizer between the middle axle and the other end axle and having a yoke slidably receiving the journal box on the latter axle, springs supported by said equalizers, a pedestalless truck frame supported by said springs, and longitudinally and transversely extending anchor devices between each equalizer and the truck frame to position the wheels, axles and journal boxes relative to the truck frame without direct engagement of the truck frame by the journal boxes and equalizers and to position the equalizers against relative movement longitudinally of the truck, said anchor devices freeing said journal boxes and springs of transmission of forces longitudinally and transversely of the truck between the truck frame and equalizers.

5. In a railway six-wheel truck including wheels, axles and journal boxes, an equalizer extending between and supported by adjacent boxes, a single spring unit supported by the equalizer, a pedestalless frame supported by said spring unit, said spring unit providing for vertical movement of the frame relative to the equalizer, and elongated devices one extending transversely of the truck and the other extending longitudinally of the truck and each yieldingly connected at one end to the frame and at the other end to the equalizer, the connection of the two devices to the equalizer being adjacent each other and being free of sliding contact with the equalizer and frame and holding the equalizer and frame in spaced relation transversely and longitudinally of the truck independently of the journal box and spring unit and accommodating relative vertical movement of the frame and equalizer.

6. In a railway six-wheel truck including wheels, axles and journal boxes, two equalizers in longitudinal alignment at each side of the truck, each equalizer extending between and supported at its ends by the middle journal box and a respective end journal box, a single spring unit carried by each equalizer, a truck frame supported by said spring units, said spring units providing for vertical movement of the frame relative to the equalizers, an elongated anchor associated with each equalizer and extending longitudinally of the truck and connected at its ends to the equalizer and to the frame respectively and positioning the frame and the equalizer relative to each other longitudinally of the truck and holding them against contact with each other independently of the journal boxes and spring units, the equalizers engaging the associated journal boxes and determining their relative position longitudinally of the truck.

7. In a railway six-wheel truck including wheels, axles and journal boxes, two equalizers in longitudinal alignment at each side of the truck, each equalizer extending longitudinally of the truck between and supported at its ends by the middle journal box and a respective end journal box, spring units supported by said equalizers, each equalizer supporting only a single spring unit, an elongated anchor associated with each equalizer and extending longitudinally of the truck and yieldingly connected at its ends to the equalizer and to the frame respectively, said anchors positioning the equalizers relative to each other and to said frame longitudinally of the truck and independently of the journal boxes and spring units, and an elongated anchor associated with each equalizer and extending transversely of the truck and yieldingly connected at its ends to the equalizer and to the frame respectively, said latter-mentioned anchors positioning the equalizers relative to each other and to the frame transversely of the truck independently of the journal boxes and spring units, there being elements on associated equalizers and journal boxes holding them against substantial relative movement longitudinally, transversely, and vertically of the truck.

8. In a railway six-wheel truck including three wheel, axle and journal box assemblies, two equalizers arranged end to end at each side of the truck and supported at their adjacent ends by a common assembly and at their remote ends by an individual assembly, a single spring unit supported by a portion of each equalizer between the assemblies supporting that equalizer, a truck frame supported by the spring units, said spring units providing for vertical movement of the frame relative to the equalizers, and an individual elongated anchor connecting the frame and each of said equalizer portions and positioning said equalizer portions transversely of the truck relative to the frame independently of the journal boxes and spring units but accommodating a limited movement of the ends of the equalizers at the center of the truck with the associated assemblies relative to said portions so as to permit relative shifting of the assemblies transversely of the truck when on curved track.

H. M. PFLAGER.

REFERENCES CITED

The following references are of record in the file of this patent:

UNITED STATES PATENTS

| Number | Name | Date |
|---|---|---|
| 1,472,135 | Pilcher | Oct. 30, 1923 |
| 2,047,251 | Bender | July 14, 1936 |
| 2,051,646 | Oelkers | Aug. 18, 1936 |
| 2,089,110 | Bugatti | Aug. 3, 1937 |
| 2,241,418 | Nystrom et al. | May 13, 1941 |
| 2,276,337 | Pflager | Mar. 17, 1942 |
| 2,334,024 | Nystrom et al. | Nov. 9, 1943 |
| 2,347,362 | Nystrom et al. | Apr. 25, 1944 |
| 2,350,567 | Nystrom et al. | June 6, 1944 |

FOREIGN PATENTS

| Number | Country | Date |
|---|---|---|
| 321,209 | Germany | May 20, 1920 |